United States Patent
Mayhew

(10) Patent No.: US 7,378,816 B2
(45) Date of Patent: May 27, 2008

(54) SYSTEM AND METHOD FOR CONFIRMING A DETECTION OF LOW VOLTAGE AND SHORTED SCRS

(75) Inventor: Scott Mayhew, North Aurora, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 347 days.

(21) Appl. No.: 11/208,146

(22) Filed: Aug. 19, 2005

(65) Prior Publication Data

US 2006/0049794 A1    Mar. 9, 2006

Related U.S. Application Data

(60) Provisional application No. 60/606,983, filed on Sep. 3, 2004.

(51) Int. Cl.
*H02P 1/24*     (2006.01)
(52) U.S. Cl. .................. 318/727; 318/782; 318/786
(58) Field of Classification Search ......... 318/700–805
See application file for complete search history.

(56) References Cited

U.S. PATENT DOCUMENTS 6,201,369 B1 *   3/2001   Johnson ............... 318/811
6,586,905 B1 *   7/2003   Johnson ............... 318/778

FOREIGN PATENT DOCUMENTS

| JP | 2548814 | 8/1996 |
|---|---|---|
| JP | 11-150676 | 6/1999 |
| JP | 2003-255442 | 9/2003 |

* cited by examiner

*Primary Examiner*—Karen Masih

(57) ABSTRACT

A motor controller system includes solid state switches for connection between an AC line and motor terminals for controlling application of AC power to a motor. Voltage sensors sense voltage across each of the solid state switches and AC line voltage. A control circuit controls operation of the solid state switches. The control circuit compares the sensed voltages across each of the solid state switches with the AC line voltage in a non-run mode to determine if there is a shorted solid state switch.

22 Claims, 4 Drawing Sheets

SYSTEM AND METHOD FOR CONFIRMING A DETECTION OF LOW VOLTAGE AND SHORTED SCRS

CROSS REFERENCE TO RELATED APPLICATIONS

This application claims priority of provisional application No. 60/606,983 filed Sep. 3, 2004.

FIELD OF THE INVENTION

This invention relates to a motor controller and more particularly, a system and method for confirming detection of low voltage and shorted SCRs.

BACKGROUND OF THE INVENTION

Solid state starters/controllers have found widespread use for controlling application of power to an AC induction motor. The conventional starter/controller, referred to hereinafter as simply a starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

A conventional motor controller system may use current transformers for sensing current in the SCRs, generally representing current of each motor winding. The SCRs can be wired with the motor windings in a delta configuration or in a wye configuration. In a delta configuration, a shorted SCR will cause current to flow in the motor in a non-run mode, namely when the SCR is on but should be off, the motor is connected to the motor controller system and voltage is present. The current transformers can sense this current. However, with in-line wiring as in a wye configuration a shorted SCR does not produce current flow. Instead, there must be two shorted SCRs to have current flow in a non-run mode.

Typically, a fault contactor includes fault contacts wired in series with the SCRs and can be used for isolation. Another known method for detecting shorted SCRs is to sense for a low voltage across the SCR in a non-run mode. However, if a fault contact is opened or there is an open motor winding, then these conditions will also show a low voltage across the SCRs. This can cause such a motor controller to sense a shorted SCR when in fact the SCR is not shorted. This can result in unnecessary service calls.

The present invention is directed to solving one or more of the problems discussed above, in a novel and simple manner.

SUMMARY OF THE INVENTION

In accordance with the invention, there is provided a system and method for confirming detection of low voltage and shorted switches.

Broadly, in accordance with one aspect of the invention, there is disclosed a motor controller system including solid state switches for connection between an AC line and motor terminals for controlling application of AC power to a motor. Voltage sensors sense voltage across each of the solid state switches and AC line voltage. A control circuit controls operation of the solid state switches. The control circuit compares the sensed voltages across each of the solid state switches with the AC line voltage in a non-run mode to determine if there is a shorted solid state switch.

It is a feature of the invention that the control circuit compares the sensed voltages across each of the solid state switches with a select percentage of the AC line voltage in the non-run mode to determine if there is a shorted solid state switch.

It is another feature of the invention that the control circuit compares the sensed voltages across each of the solid state switches with a select lower limit in a non-run mode to determine if there is an open motor lead.

It is still another feature of the invention to provide current sensors for sensing current in each solid state switch. The control circuit compares the sensed current to a select current level in the non-run mode to determine if there is a shorted solid state switch.

It is another feature of the invention that the control circuit comprises a programmed processor.

It is still a further feature of the invention that the solid state switches comprise SCRs.

There is disclosed in accordance with another aspect of the invention, an elevator starter comprising solid state switches for connection between an AC line and motor terminals for controlling application of AC power to the elevator. Voltage sensors sense voltage across each of the solid state switches and AC line voltage. A control circuit controls operation of the solid state switches. The control circuit compares the sensed voltages across each of the solid state switches with the AC line voltage in a non-run mode to determine if there is a shorted solid state switch.

There is disclosed in accordance with yet another aspect of the invention, a motor controller system comprising solid state switch means for connection between an AC line and motor terminals for controlling application of AC power to the motor. Voltage sensing means sense voltage across each of the solid state switch means and AC line voltage. Motor control means are operatively connected to the voltage sensing means for controlling operation of the solid state switch means. The motor control means compare the sensed voltages across each of the solid state switch means with the AC line voltage in a non-run mode to determine if there is a shorted solid state switch means.

There is disclosed in accordance with yet another aspect of the invention, the method of detecting shorted controller switches comprising: providing solid state switches for connection between an AC line and motor terminals for controlling application of AC power to the motor; sensing voltage across each of the solid state switches; sensing AC line voltage; and in a non-run mode comparing the sensed voltages across each of the solid state switches with the AC line voltage to determine if there is a shorted solid state switch.

Further features and advantages of the invention will be readily from the specification and from the drawings.

DETAILED DESCRIPTION OF THE INVENTION

Figure 1:
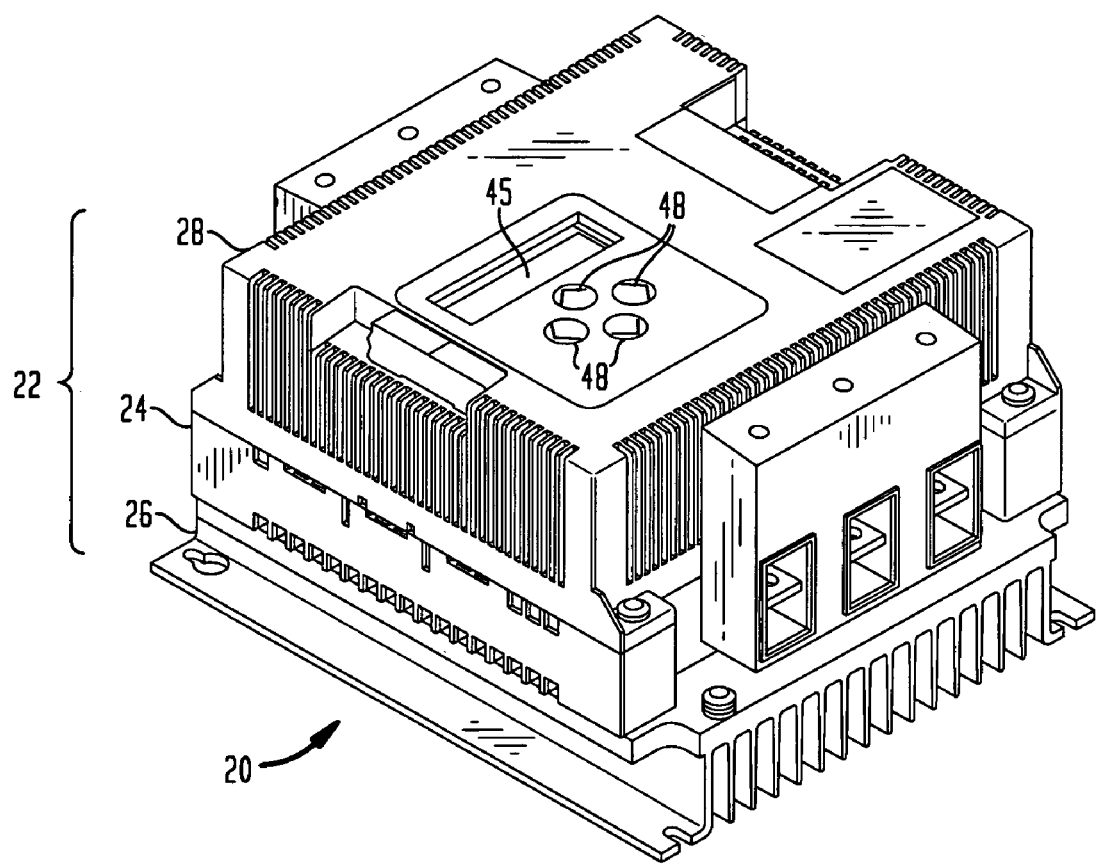
FIG. 1 is a perspective view of a motor controller in accordance with the invention.

Referring initially to FIG. 1, a solid state motor starter/controller 20, referred to hereinafter as simply a starter or a controller, is illustrated. One application for the motor controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art. Each SCR 32 is connected between a line terminal L1, L2 or L3 and a respective motor winding terminal T1, T2 or T3.

Figure 2:
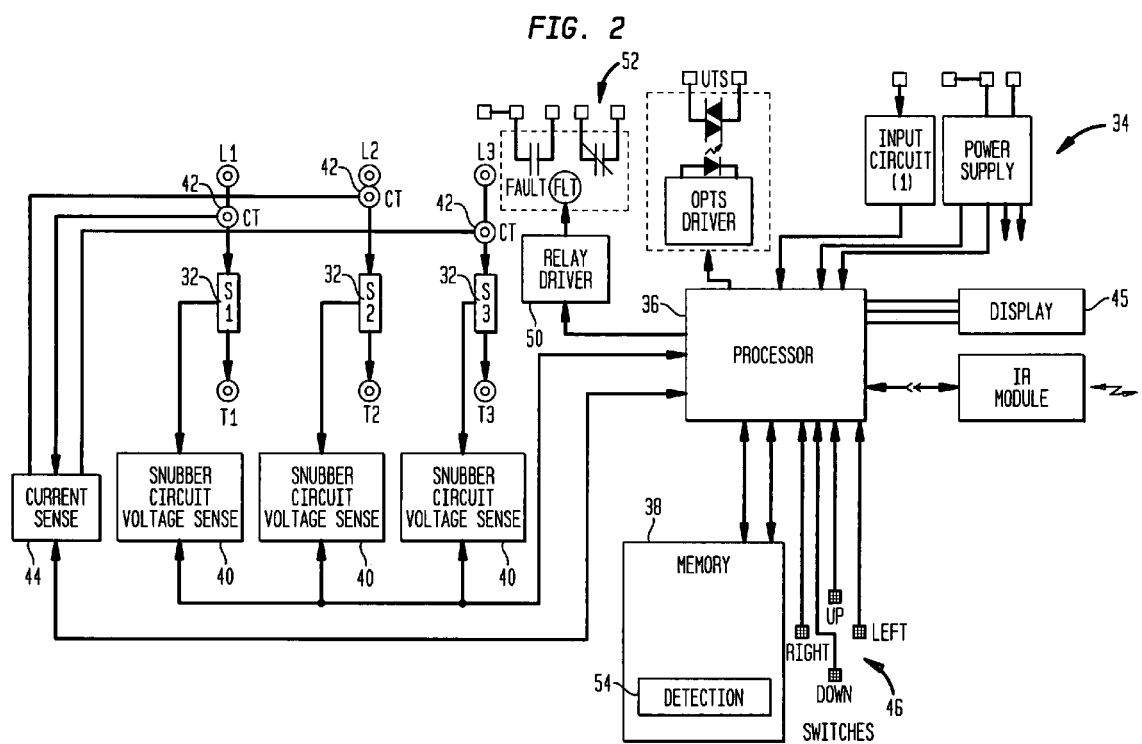
FIG. 2 is a block diagram of the motor controller of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below.

The processor 36 is connected to three interface circuits 40 each operatively associated with one of the SCRs 32. Particularly, the interface circuits 40 comprise snubber circuits for driving the SCRs 32 and voltage sense circuits for sensing line voltage and motor terminal voltage. As such, the interface circuits can determine line-to-line voltages, i.e. L1-L2, L2-L3 and L3-L1, and voltage across the SCRs 32, i.e., L1-T1, L2-T2 and L3-T3. A current transformer 42 senses current through each of the SCRs 32 and is connected to a current sense circuit 44. Other types of current sensors could be used. The current sense circuit 44 is also connected to the processor 36.

An LCD display 45 on the cover 22, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

The processor 36 is connected to a relay driver circuit 50 that operates a fault contactor 52. The fault contactor 52 actuates fault contacts FC1, FC2 and FC3, see FIG. 3, to disable motor operation under fault conditions.

Figure 3:
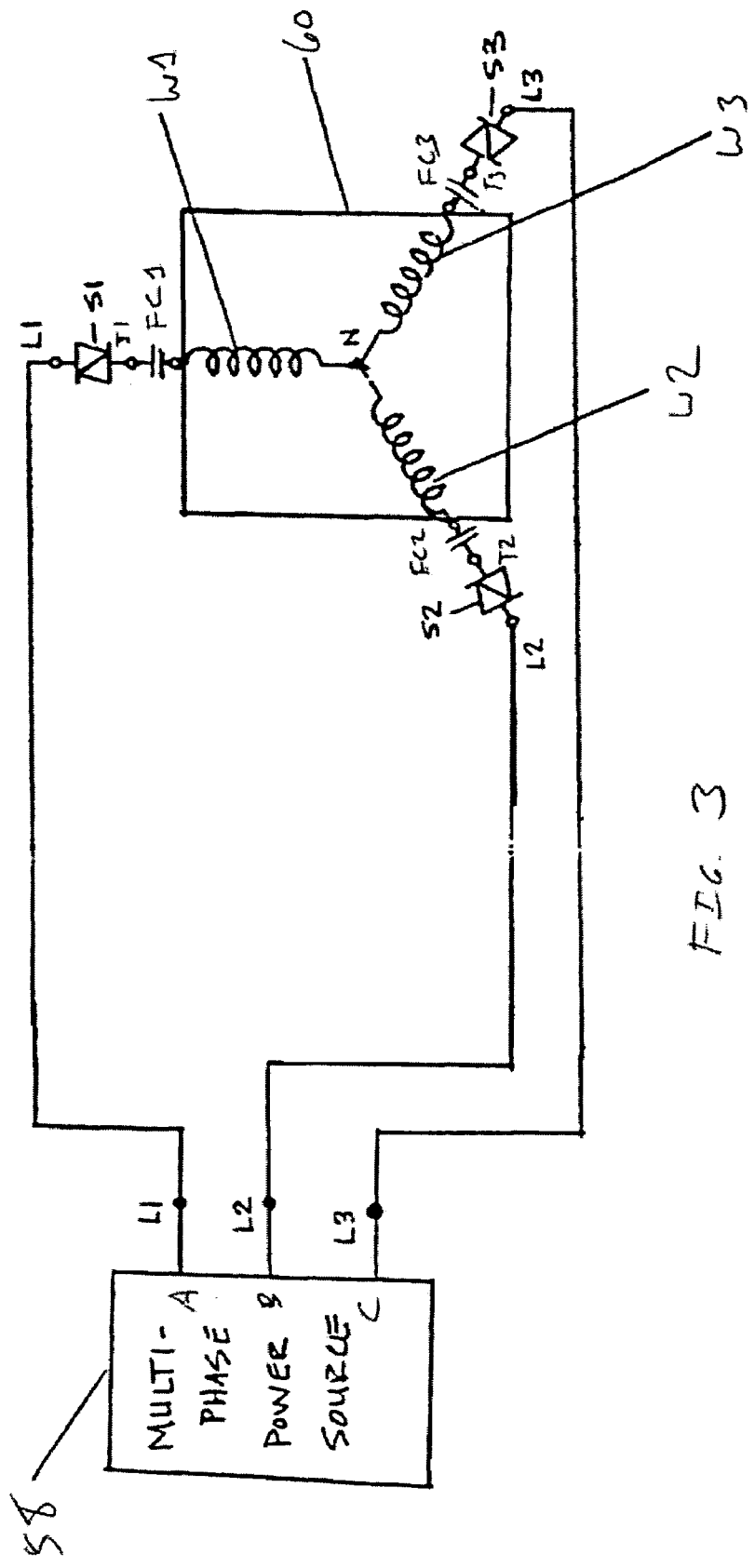
FIG. 3 is a wiring diagram of the motor controller of FIG. 1 connected to a motor in a wye configuration.

Referring to FIG. 3, an electrical schematic illustrates connection of the SCRs 32 of FIG. 2 in line between a multi-phase power source 58 and a motor 60 having motor windings in a wye configuration. One of the SCRs 32, labeled S1, is connected in series with the A phase line L1, the first fault contact FC1 and the first motor winding W1. A second of the SCRs 32, labeled S2, is connected in series with the B phase line L2, the second fault contact FC2 and the second motor winding W2. A third of the SCRs 32, labeled S3, is connected in series with the C phase line L3, the third fault contact FC3 and the third motor winding W3. The opposite sides of the motor windings W1, W2, and W3 are connected to form a neutral N. As is apparent, other motor configurations could be used in connection with the disclosed system and method.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. As is conventional, the firing angle is controlled by the processor 36 to satisfy operating requirements. During start mode, the processor 36 ramps the current up by gradually advancing the firing angle in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch provided that the voltage to the motor can be increased at a rate greater than the decrease in the motor slip resistance as the motor comes up to speed. Subsequently during a run mode the control circuit 34 applies full voltage to the motor.

In accordance with the invention, the control circuit 34 utilizes a detection module 54, see FIG. 2, to detect low voltage and shorted SCR conditions in a non-run mode.

The detection module 54 separately compares input line voltage to each of the SCR voltages. As a result, the method of the present invention overcomes limitations of conventional detection methods because the detection module 54 detects single shorted SCRs and will not falsely fault out on other conditions that result in low voltages across the SCRs.

Figure 4:
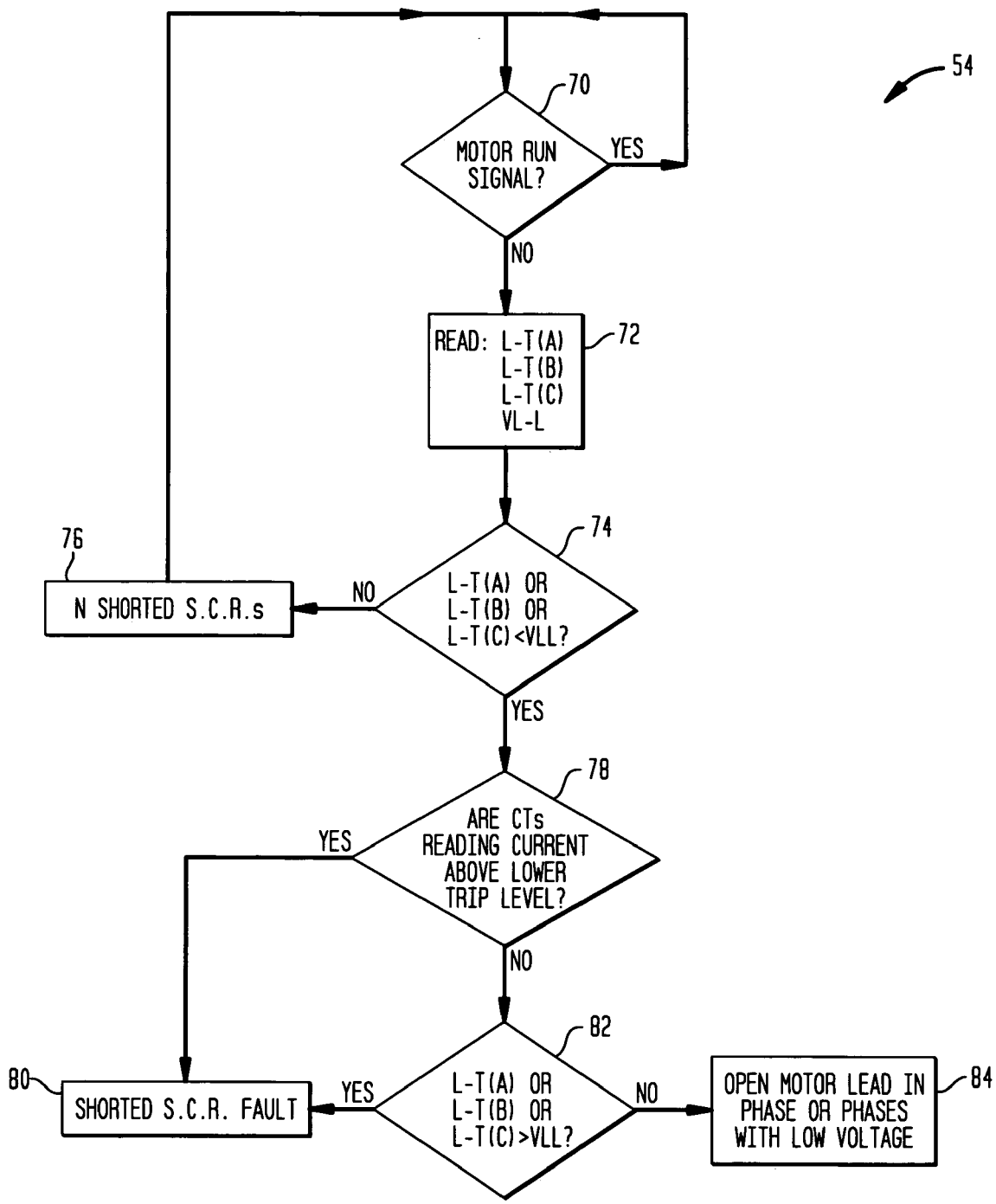
FIG. 4 is a flow diagram illustrating a low voltage and shorted SCR detection module implemented by a processor of FIG. 2.

A flow diagram illustrating sequence of operation of the detection module 54 is illustrated in flow diagram form in FIG. 4. The detection module 54 runs continuously. However, the detection module 54 only confirms detection of low voltage and shorted SCRs in a non-run mode. Particularly, the module begins with a decision block 70 that determines if a motor run signal is commanded. If so, then the program loops back on the decision block 70 until there is no motor run signal, i.e., the motor is in a non-run mode and none of the SCRs 32 are being fired. In the non-run mode, a block 72 reads various sensed voltages. The first sensed voltage is L-T (A) which is the voltage across the first SCR S1, see FIG. 3, between the terminal L1 and T1 for the A phase. The second sensed voltage is L-T (B) which is the voltage across the second SCR S2 between the terminals L2 and T2 for the B phase. The third sensed voltage is L-T (C) which is the voltage across the third SCR S3 between the terminals L3 and T3 for the C phase. A fourth sensed voltage is VL-L which is the AC line voltage. The AC line voltage can be the sensed voltage across any pair of the lines L1, L2 and L3. In accordance with the invention, a single line to line voltage could be used for all comparisons, discussed below. Alternatively, all three pairs could be measured for comparison to respective ones of the SCRs 32, as will be apparent to those skilled in the art.

With a motor wired in a wye configuration the voltage drop across the SCRs would normally be 0.57 VL-L in the non-run mode. If a single SCR 32 is shorted, then this has the effect of moving the neutral point to the phase associated with the shorted SCR. Under these conditions, the voltage across the other SCRs will be equal to the line to line voltage VL-L. If two SCRs 32 are shorted, then the sensed voltage across the other SCR in a non-run mode would be about 0.86 VL-L.

In accordance with the invention, the method first determines if there is a low voltage, significantly below 0.57 VL-L. If so, then the method confirms that there is a shorted SCR by checking for current flow or determining the ratio of the sensed SCR voltages to the line to line voltage VLL in a non-run mode for any of the SCRs. To confirm that an SCR is shorted, the ratio of SCR voltage to VL-L must be sufficiently greater than 0.57 to avoid false detection, and be below 0.86 to insure that both single and dual shorted SCRs are detected. The ratio could be in the range of, for example, 0.75 to 0.85. In an illustrative embodiment of the invention, the ratio is selected to be 0.80.

To implement the method in accordance with the invention, two threshold values are used. A threshold VLL is a voltage lower limit sensing threshold. This is a value selected so that if sensed voltage is above this value, then the SCRs are not shorted. Another threshold value VUL is an upper limit of sensing threshold. This value is selected as a percentage or ratio of the line voltage VL-L, as discussed above.

After the various voltage levels are sensed at the block 72, a decision block 74 determines if any of the SCR voltages is less than VLL. If not, there are no shorted SCRs, as indicated at block 76, and the program returns to the decision block 70. If so, then the method detects a low voltage condition, which could represent a shorted SCR. A decision block 78 determines if any of the current transformers 42 read a current above a lower trip level. In a non-run mode there should be no current flow. If so, then a shorted SCR fault is indicated at a block 80. This could occur, for example, if there are two shorted SCRs. With only a single shorted SCR, there should not be any current flow. If the current readings are not above the lower trip level, then a decision block 82 determines if any of the SCR voltages are greater than the upper limit threshold VUL. As discussed above, this threshold may be on the order of 80% of the line to line voltage VL-L. If any of the SCRs are above this threshold VLL, then a shorted SCR is confirmed and a fault is indicated at the block 80. If none of the SCR voltages are greater than the upper limit threshold VUL, then the module has detected an open motor lead in the phase or phases with the low voltage condition and this determination is indicated at a block 84.

As will be apparent, when a shorted SCR fault condition exists, as indicated at the block 80, then the processor 36 will operate the relay driver 52 to open the fault contacts FC1, FC2 and FC3. Also, a fault will be displayed on the display 45.

Thus, the disclosed system and method confirms a valid detection of a shorted SCR.

While the system and method are described herein in connection with an in line configuration, as shown in FIG. 3, the system and method could be used with other wiring configurations, as will be apparent to those skilled in the art.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It can therefore be appreciated that a new and novel system and method for confirming detection of low voltage and shorted SCRs in a motor controller has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

I claim:

1. A motor controller system comprising:
   solid state switches for connection between an AC line and motor terminals for controlling application of AC power to the motor;
   voltage sensors for sensing voltage across each of the solid state switches and AC line voltage; and
   a control circuit for controlling operation of the solid state switches, the control circuit comparing the sensed voltages across each of the solid state switches with the AC line voltage in a non-run mode to determine if there is a shorted solid state switch.

2. The motor controller system of claim 1 wherein the control circuit compares the sensed voltages across each of the solid state switches with a select percentage of the AC line voltage in the non-run mode to determine if there is a shorted solid state switch.

3. The motor controller system of claim 1 wherein the control circuit further compares the sensed voltages across each of the solid state switches with a select lower limit in a non-run mode to determine if there is an open motor lead.

4. The motor controller system of claim 1 further comprising current sensors for sensing current in each solid state switch and wherein the control circuit compares the sensed current to a select current level in the non-run mode to determine if there is a shorted solid state switch.

5. The motor controller system of claim 1 wherein the control circuit comprises a programmed processor.

6. The motor controller system of claim 1 wherein the solid state switches comprise SCRs.

7. An elevator starter comprising:
   solid state switches for connection between an AC line and motor terminals for controlling application of AC power to the elevator;
   voltage sensors for sensing voltage across each of the solid state switches and AC line voltage; and
   a control circuit for controlling operation of the solid state switches, the control circuit comparing the sensed voltages across each of the solid state switches with the AC line voltage in a non-run mode to determine if there is a shorted solid state switch.

8. The elevator starter of claim 7 wherein the control circuit compares the sensed voltages across each of the solid state switches with a select percentage of the AC line voltage in the non-run mode to determine if there is a shorted solid state switch.

9. The elevator starter of claim 7 wherein the control circuit further compares the sensed voltages across each of the solid state switches with a select lower limit in a non-run mode to determine if there is an open motor lead.

10. The elevator starter of claim 7 further comprising current sensors for sensing current in each solid state switch and wherein the control circuit compares the sensed current to a select current level in the non-run mode to determine if there is a shorted solid state switch.

11. The elevator starter of claim 7 wherein the control circuit comprises a programmed processor.

12. The elevator starter of claim 7 wherein the solid state switches comprise SCRs.

13. A motor controller system comprising:
   solid state switch means for connection between an AC line and motor terminals for controlling application of AC power to the motor;
   voltage sensing means for sensing voltage across each of the solid state switch means and AC line voltage; and
   motor control means operatively connected to the voltage sensing means for controlling operation of the solid state switch means, the motor control means comparing the sensed voltages across each of the solid state switch means with the AC line voltage in a non-run mode to determine if there is a shorted solid state switch means.

14. The motor controller system of claim 13 wherein the motor control means compares the sensed voltages across each of the solid state switch means with a select percentage of the AC line voltage in the non-run mode to determine if there is a shorted solid state switch means.

15. The motor controller system of claim 13 wherein the motor control means further compares the sensed voltages across each of the solid state switch means with a select lower limit in a non-run mode to determine if there is an open motor lead.

16. The motor controller system of claim 13 further comprising current sensing means for sensing current in each solid state switch and wherein the motor control means compares the sensed current to a select current level in the non-run mode to determine if there is a shorted solid state switch means.

17. The motor controller system of claim 13 wherein the motor control means comprises a programmed processor.

18. The motor controller system of claim 13 wherein the solid state switch means comprise SCRs.

19. A method of detecting shorted controller switches comprising:
   providing solid state switches for connection between an AC line and motor terminals for controlling application of AC power to the motor;
   sensing voltage across each of the solid state switches;
   sensing AC line voltage; and
   in a non-run mode comparing the sensed voltages across each of the solid state switches with the AC line voltage to determine if there is a shorted solid state switch.

20. The method of detecting shorted controller switches of claim 19 wherein comparing the sensed voltages across each of the solid state switches with the AC line voltage comprises comparing the sensed voltages across each of the solid state switches with a select percentage of the AC line voltage in the non-run mode to determine if there is a shorted solid state switch.

21. The method of detecting shorted controller switches of claim 19 further comprising comparing the sensed voltages across each of the solid state switches with a select lower limit in a non-run mode to determine if there is an open motor lead.

22. The method of detecting shorted controller switches of claim 19 further comprising sensing current in each solid state switch and comparing the sensed current to a select current level in the non-run mode to determine if there is a shorted solid state switch.

* * * * *